United States Patent [19]

Tuerk

[11] Patent Number: 4,657,062
[45] Date of Patent: Apr. 14, 1987

[54] ROLL TARP LOCKING ASSEMBLY

[76] Inventor: Robert P. Tuerk, 442 Bent Tree La., Indianapolis, Ind. 46260

[21] Appl. No.: 709,703

[22] Filed: Mar. 8, 1985

[51] Int. Cl.⁴ .................. B65D 43/02; B65D 45/14; B60P 7/04
[52] U.S. Cl. .................. 160/243; 160/328; 160/395; 296/98; 296/100; 248/499; 292/247; 292/256.69
[58] Field of Search .............. 296/98, 100; 292/247, 292/256.69, DIG. 49; 160/328, 329, 23 R, 399, 395, 243; 105/377; 248/499; 24/69 CF

[56] References Cited

U.S. PATENT DOCUMENTS

| | | | |
|---|---|---|---|
| 427,233 | 5/1890 | Harrison | 292/247 |
| 775,172 | 11/1904 | Hunt | 292/247 |
| 978,357 | 12/1910 | Christman | 296/119 X |
| 1,033,338 | 7/1912 | Miller | 296/119 X |
| 1,070,672 | 8/1913 | Dreyer | 24/69 CT |
| 1,538,384 | 5/1925 | Crockett et al. | 296/102 X |
| 2,465,621 | 3/1949 | Wheeler | 296/100 X |
| 2,605,826 | 8/1952 | Lang | 160/328 |
| 3,384,413 | 5/1968 | Sargent | 296/98 |
| 3,425,098 | 2/1969 | Bredvik | 24/68 R |
| 3,511,408 | 5/1970 | Hughes | 296/98 |
| 3,805,988 | 4/1974 | Walker et al. | 220/411 |
| 4,020,888 | 5/1977 | Upton et al. | 160/23 R |
| 4,212,492 | 7/1980 | Johnson | 296/98 |
| 4,302,043 | 11/1981 | Dimmer et al. | 296/98 |
| 4,471,991 | 9/1984 | Matthias | 296/91 |
| 4,484,777 | 11/1984 | Michel | 296/98 |
| 4,505,512 | 3/1985 | Schmeichel et al. | 296/98 |

FOREIGN PATENT DOCUMENTS

| | | | |
|---|---|---|---|
| 3136897 | 3/1983 | Fed. Rep. of Germany | 296/100 |
| 2268669 | 11/1975 | France | 296/98 |
| 141920 | 8/1983 | Japan | 296/98 |
| 467371 | 6/1937 | United Kingdom | 292/247 |
| 652307 | 3/1979 | U.S.S.R. | 292/247 |

Primary Examiner—Robert B. Reeves
Assistant Examiner—Dennis H. Pedder
Attorney, Agent, or Firm—Laubscher & Laubscher

[57] ABSTRACT

A roll tarp system for covering the open top of a truck semi-trailer, characterized by the use of a novel roll bar construction in combination with an adjustable toggle clamp for locking the tarp in its closed unrolled condition. A rectangular tarp or cover member is connected at one longitudinal edge with the upper edge of one longitudinal side wall of the container. A roll bar is connected with the other longitudinal edge of the tarp via a first longitudinally extending peripheral groove contained in the roll bar. The roll bar includes at least one longitudinally slidable and positionable fastening device arranged in a second groove diametrically opposite the first groove, a cable member being fastened at one end to the fastening device. The other end of the cable is connected to the adjustable toggle clamp which is mounted on the external surface of the other longitudinal side wall of the container below and vertically spaced from the roll bar when the tarp is in the unrolled condition covering the opening in the top of the container. When the clamp is operated, it tensions the cable and the tarp and retains the tarp in the unrolled closed condition. The roll bar may have a generally circular outer cross-sectional configuration, or a "figure-8" cross-section.

11 Claims, 11 Drawing Figures

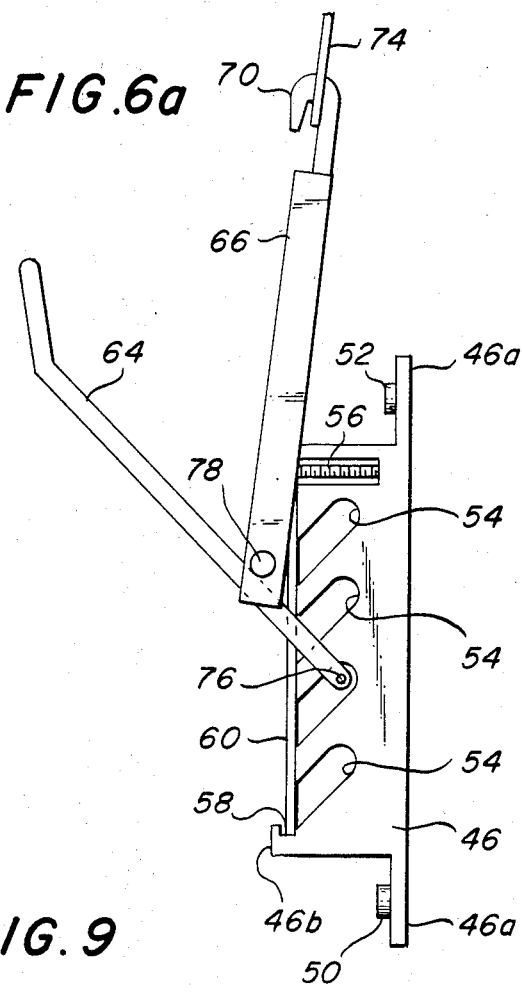
FIG.6a
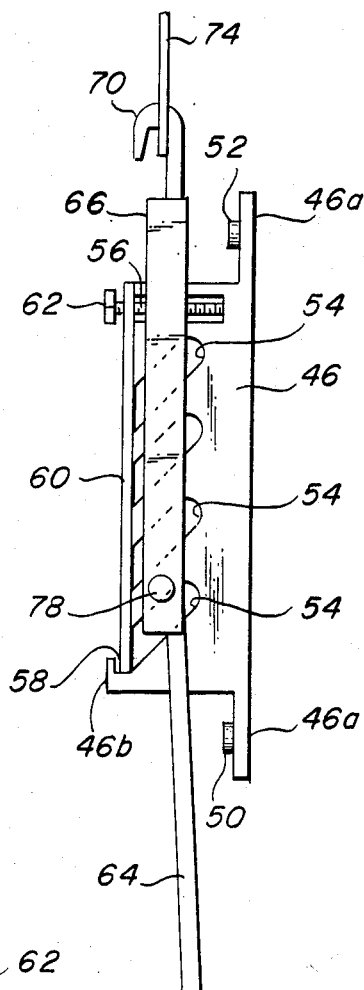
FIG.6b
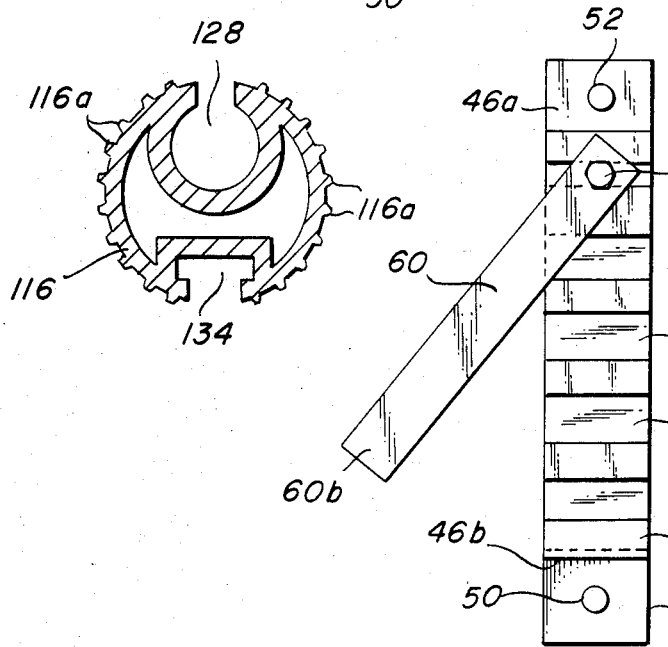
FIG.9
FIG.7
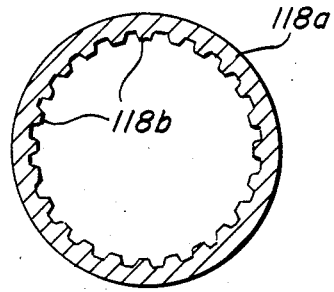
FIG.10

ROLL TARP LOCKING ASSEMBLY

BACKGROUND OF THE INVENTION

The present invention relates to an improved roll tarp locking assembly, and particularly to an improved roll bar construction operable with a tensioning and locking device for securing a roll tarp in its unrolled condition to cover the open top of a container, open-topped semi-trailer, or other receptacle.

BRIEF DESCRIPTION OF THE PRIOR ART

Roll tarp assemblies for use with open topped semi-trailers are well known in the patented prior art, as evidenced by the U.S. patents to Sargent Pat. No. 3,384,413, Johnsen Pat. No. 4,212,492, Dimmer et al. Pat. No. 4,302,043 and Michel Pat. No. 4,484,777. Such tarps are normally fastened along one longitudinal edge with the upper edge of one wall of the truck semi-trailer. The other longitudinal edge of the tarp is connected with a longitudinal cylinder about which the tarp is rolled and unrolled as the semi-trailer is covered and uncovered, respectively. With the semi-trailer in its uncovered condition, the rolled tarp and cylinder are normally positioned adjacent the fastened longitudinal edge. When the tarp is unrolled to cover the semi-trailer, the free edge of the tarp and the cylinder pass over the upper edge of the opposite wall of the semi-trailer, and hang down against the outer surface thereof.

In order to secure the tarp in its unrolled condition, whereby the semi-trailer is covered for transport, it is necessary to secure the free longitudinal edge of the tarp or the longitudinal cylinder connected therewith to the opposite wall of the semi-trailer. The afore-mentioned Sargent patent discloses the use of buckles connected with the semi-trailer wall to which straps attached to the tarp edge are connected. In the assembly disclosed in the Johnsen patent, tie-down hooks are connected to the side wall of the trailer bed and straps attached to the cylinder are connected with the hook.

While the prior devices normally operate quite satisfactorily, they do possess certain inherent drawbacks. The prior fastening devices are normally rather awkward and time consuming to fasten, generally requiring threading and tightening of straps. With the tarp fastened in the unrolled condition, the prior fastening devices have a tendency to loosen the straps during transport of the trailer owing to the vibration of the tarp from the wind generated by the moving trailer. Another drawback of the prior devices is that they are not suitably adjustable for variations in tarp dimensions owing to stretching, shrinkage, or replacement.

The present invention was developed to overcome these and other drawbacks of the prior devices by providing an improved roll tarp tensioning and locking system.

SUMMARY OF THE INVENTION

Accordingly, it is primary object of the present invention to provide a roll tarp system for covering an open-topped rectangular container, such as a truck semi-trailer, use being made of a roll bar of improved construction for fastening one longitudinal edge of the cover—when in an unrolled condition—to the external surface of a longitudinal side wall of the container. The roll bar contains a pair of diametrically arranged longitudinally extending grooves a first one of which receives the longitudinal edge of the cover, and a second one of which receives at least one fastening means for clamping the roll bar to the container. A cable is connected at its opposite ends with the fastening and toggle clamping devices, respectively. The toggle clamping device is operable to tension the cable member and thereby tension the cover member.

According to another object of the invention, the fastening device comprises a slide member slidably mounted in the second longitudinal groove contained in the roll bar so that when the cover member is in the unrolled condition, the slide member may be vertically aligned with the toggle clamping device.

According to a more specific object of the invention, the toggle clamping device includes a toggle bracket containing a plurality of vertically spaced recesses, and a toggle lever having a horizontal cross bar portion at one end arranged with a selected one of the recesses and a handle portion at the other end, the cable being connected with an intermediate portion of the toggle lever.

In accordance with a further object of the invention, the roll bar is formed of light-weight material, such as extruded aluminum, a synthetic plastic material or the like. The roll bar is preferably hollow throughout its length. In one embodiment, the roll bar has a generally circular cross-sectional configuration, and in another embodiment, the roll bar has a "figure-8" cross-sectional configuration.

BRIEF DESCRIPTION OF THE FIGURES

Other objects and advantages of the invention will become apparent from a study of the following specification when viewed in the light of the accompanying drawing, in which:

FIGS. 6a and 6b are side plan view of the toggle clamp device in its unlocked and locked conditions, respectively;

FIG. 7 is a front plan view of the toggle bracket;

FIG. 9 is a cross-sectionsl view of the preferred roll bar construction; and

FIG. 10 is a cross-sectional view of a portion of the crank handle means for operating the roll bar of FIG. 9.

DETAILED DESCRIPTION

Figure 1:
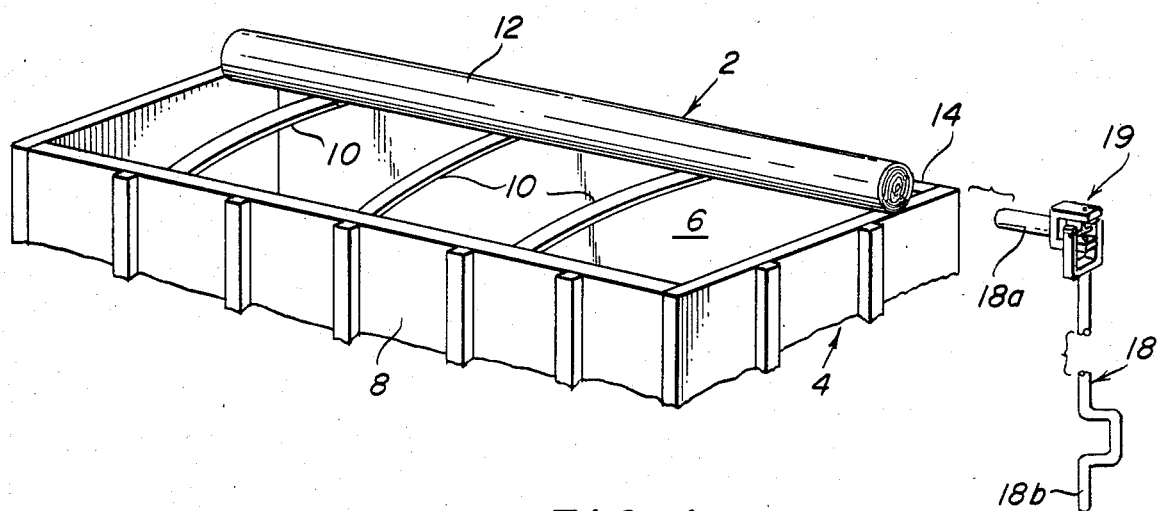
FIG. 1 is a partial perspective view of the roll tarp assembly in the open rolled condition on a rectangular open topped container.
Figure 2:
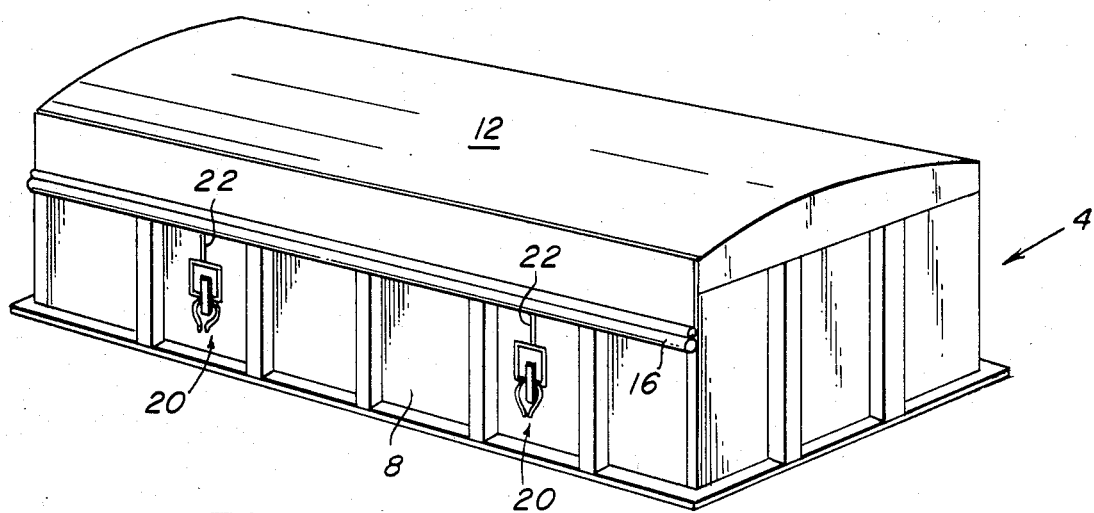
FIG. 2 is a perspective view of the roll tarp assembly in the closed unrolled condition.

Referring first more particularly to FIGS. 1 and 2, the present invention relates to a locking device for a roll tarp assembly 2 operable to cover an open-topped rectangular container 4, such as a truck semi-trailer. The container includes a pair of opposed longitudinal side walls 6, 8 and a plurality of spaced laterally extending top support braces 10 connected between the upper edges thereof.

The roll tarp assembly includes a rectangular tarpaulin or cover member 12 for covering the top of the container as shown in FIG. 2. The braces support the tarp across the open top of the container to prevent the tarp from sagging under the weight of rain or snow. The tarp is formed of any suitable flexible waterproof material such as a treated fabric or a synthetic plastic material characterized by strength and durability.

As shown in FIGS. 1 and 2, one longitudinal edge 14 of the tarp 12 is connected with the upper edge of the container side wall 6, and the other longitudinal edge of the tarp is connected with a longitudinal roll bar 16. When the tarp is in its closed condition covering the top of the container as shown in FIG. 2, the roll bar and associated tarp portion extend over and beyond the upper edge of the container side wall 8, and hang downwardly adjacent the outer surface thereof.

The tarp is transferred from the closed condition of FIG. 2 to the open condition of FIG. 1 by rotating the roll bar about its longitudinal axis to progressively roll the tarp thereabout, with the roll bar and wound tarp moving toward a position adjacent the upper edge of the container side wall 6 to which the one longitudinal edge of the tarp is fastened.

As will be discussed in greater detail below, the roll bar 16 comprises a hollow cylindrical member having a keyed non-circular inner surface adapted to receive a corresponding non-circular key portion 18a of a crank 18 operable to rotate the roll bar about its axis to cover and uncover the container. As is conventional in the art, the non-circular key portion 18a is connected with the handle portion 18b of the crank via a conventional universal joint 19, whereby the handle may be operated by an operator standing at the rear of the vehicle.

In order to prevent the tarp 12 from being blown off of the container during transport, it is necessary to fasten the roll bar 16 to the container side wall 8. Accordingly, a plurality of adjustable toggle clamps 20 are secured to the exterior surface of the container side wall 8 below and vertically spaced from the roll bar with the tarp in the unrolled condition and connected with the roll bar via a plurality of cables 22 to tension and lock the tarp in the closed condition as will be set forth in greater detail below.

Figure 4:
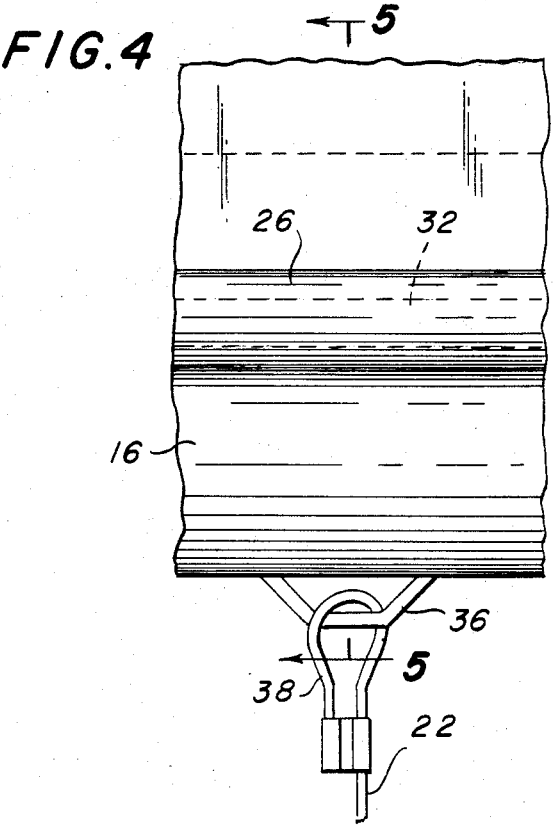
FIG. 4 is a front plan view of the roll bar assembly connected with the free edge of the cover member.
Figure 5:
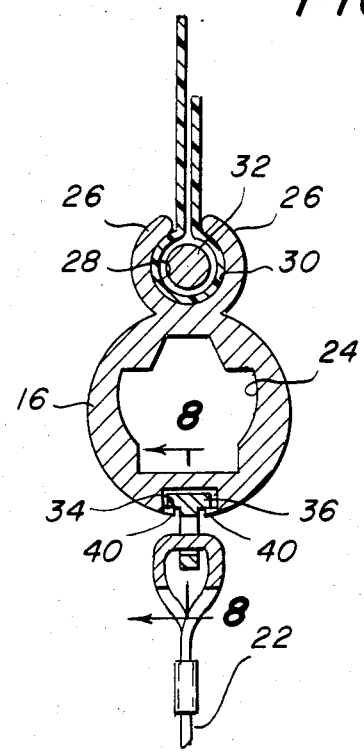
FIG. 5 is a sectional view of the roll bar taken along line 5—5 of FIG. 4.

Referring now to FIGS. 4 and 5, the connection between the roll bar 16 and the corresponding longitudinal edge of the tarp 12 will be described. As set forth above, the roll bar 16 comprises a hollow cylindrical member formed from a light-weight rigid material, such as extruded aluminum, a synthetic plastic material, or the like, having a keyed inner surface 24 adapted to receive and cooperate with the crank portion 18a to rotate the roll bar for rolling and unrolling the tarp. The roll bar—which has a generally "figure-8" configuration—includes on its upper peripheral surface a pair of longitudinal opposed retaining flanges 26 extending therefrom to define a longitudinal groove 28 throughout its length having a generally circular cross-sectional configuration. For connection with the roll bar, the longitudinal edge of the tarp is folded back and stitched to define a longitudinal pocket 30 which is arranged within the longitudinal groove 28 at the peripheral edge of the roll bar. An elongated retainer member 32, such as a cylindrical bar or a piece of rope, is arranged within the tarp pocket to retain the tarp within the longitudinal groove. As shown in FIG. 5, the diameter of the retainer member 32 is slightly less than the diameter of the circular groove 28, but greater than the width of the gap defined between the free ends of the retaining flanges 26 through which the tarp passes, whereby the flanges retain the retainer member within the groove, 28.

Figure 8:
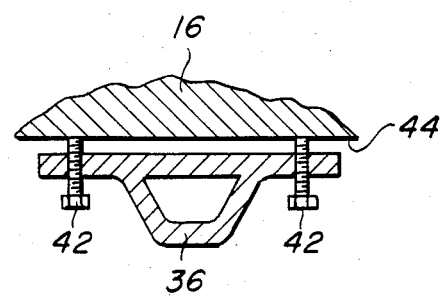
FIG. 8 is a sectional view of the slide fastening device taken along line 8—8 of FIG. 4.
Figure 3:
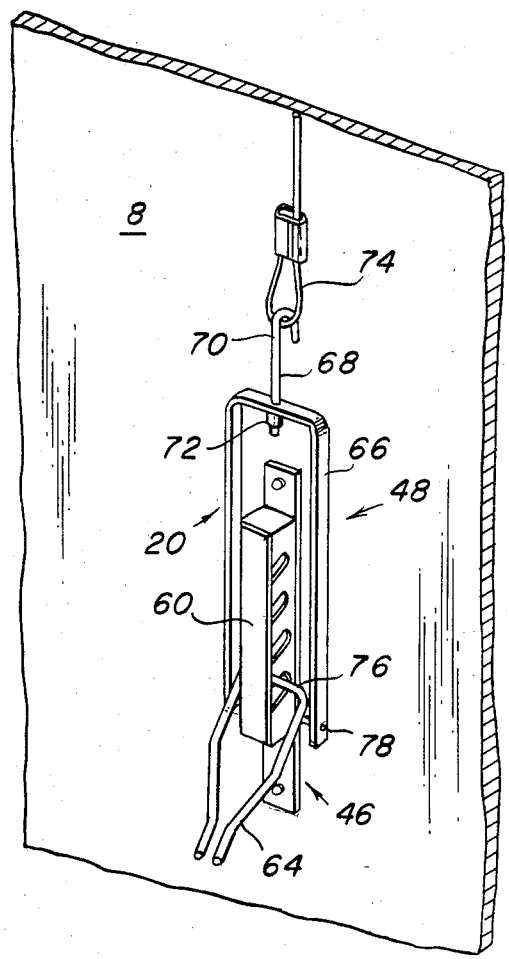
FIG. 3 is a perspective view of the toggle clamp device connected with a longitudinal side wall of the container.

The roll bar 16 contains throughout its length a longitudinal peripheral groove or recess 34 diametrically opposite the circular groove for retaining a slide member 36 with which one end 38 of the cable 22 is connected. More particularly, the slide member 36 is retained in the recess 34 by a pair of roll bar projection portions 40. The slide member is adapted for longitudinal sliding movement within the recess 34, whereby the cable may be vertically aligned with the corresponding toggle clamp 20 with which the other end of the cable 22 is connected. As shown in FIG. 8, the slide member 36 includes a pair of screws 42 threadably connected therewith. When the screws are tightened against the roll bar wall 44 defining the bottom of the recess 34, the slide member is pressed against the projection portions 40 to fix the slide member in a desired longitudinal position.

The toggle clamp 20 will be described more particularly with reference to FIGS. 3, 6a, 6b, and 7. As shown therein, the toggle clamp includes a generally rectangular bracket 46 and a lever 48 cooperating therewith for tensioning and locking the tarp in the closed condition.

The bracket 46 is vertically oriented on and fastened to the exterior surface of the container longitudinal side wall 8 by any suitable means such as threaded bolts 50 which pass through openings 52 contained in generally planar extension portions 46a of the bracket. The outer surface of the bracket contains a plurality of vertically spaced inclined recesses 54 and a horizontal channel 56. Adjacent the lower inclined recess, the bracket includes a protruding lip portion 46b defining a slot 58. A plate 60 is connected at its upper end with the bracket by a screw 62 which extends into the horizontal channel 56. The plate 60 is pivotable about the screw 62 to cover and uncover the recesses 54. When the plate covers the recesses, the lower end 60b thereof is retained in the slot 58 by the lip portion 46b of the bracket.

The toggle clamp lever 48 includes a lower handle portion 64 and an upper U-shaped member 66 containing an opening 68 for receiving a threaded hook 70 which is connected with the U-shaped member by a nut 72. The hook 70 is connected with the lower end 74 of the cable 22, the upper end 38 of which is connected with the roll bar slide member 36 as shown in FIGS. 4 and 5.

The handle portion 64 of the toggle clamp lever includes a cross bar 76 arranged in a selected one of the inclined recesses 54 of the bracket 46. More particularly, the bracket plate 60 is pivoted to uncover the recesses 54, and the cross bar 76 is positioned within one of the recesses, with the handle portion in the raised position shown in FIG. 6a and with the hook 70 connected with the end 74 of the cable 22. The plate 60 is then pivoted to its locked positon covering the recesses 54 whereby the cross bar 76 is prevented from leaving the selected recess. The lower end of the handle portion 64 opposite the cross bar 76 comprises a grip portion. Intermediate the grip and cross bar, the handle portion of the lever includes two projections 78 pivotally connected with the lower ends of the U-shaped member 66. The projections 78 are raised relative to the plane containing the cross bar and grip, whereby when the handle portion 64 is pulled downwardly to the position shown in FIG. 6b, the handle portion passes over center relative to the U-shaped member 66 to snap-lock the toggle clamp in the locked position.

As is shown by FIGS. 6a and 6b, when the handle portion is pulled downwardly, the U-shaped member 66 and hook 70 pull the cable member 22 downwardly, which in turn pulls on the roll bar to tension the tarp. With the handle portion in the over-center position of FIG. 6b, the toggle clamp locks the tarp in its closed condition.

The improved roll tarp locking device of the present invention offers many advantages over the prior devices.

After repeated rolling and unrolling, the tarp may have a tendency to shift longitudinally, whereby the cables 22 may become misaligned relative to the associated toggle clamps 20. In such a situation, the screws 42 of the slide member 36 may be loosened and the slide member may be positioned relative to the roll bar (which may be over forty feet long) to re-align the cables 22 with the associated toggle clamps 20. Then the handle portion 64 of the clamps may be lifted to raise the hook 70 to engage the lower end 74 of the realigned cable members 22.

In the preferred embodiment of FIG. 9, the hollow roll bar 116 has a generally circular external profile, the first and second grooves 128 and 134 being defined within the circular periphery of the roll bar throughout its length. The roll bar includes at least at one end thereof a plurality of equally spaced external longitudinal ribs 116a that cooperate with corresponding internal ribs 118b on the internal portion of the sleeve portion 118a of the crank handle roll bar operating means when said sleeve is mounted concentrically about the end of the roll bar.

Repeated opening and closing of the roll tarp assembly, together with exposure to the sun and variations of temperature may cause the tarp to shrink or expand. Under such conditions, the plate 60 of the toggle bracket may be pivoted to uncover the recesses 54, and the cross bar of the clamp handle portion may be placed in a different recess to compensate for variations in the tarp dimension. Similarly, where a tarp is replaced with a different tarp having a slightly different lateral dimension, the toggle clamp may be adjusted to insure that when the clamp is in the over-center locked position of FIG. 6b, the tarp is tensioned and locked in the closed condition.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. A roll tarp system for covering an open-topped rectangular container, comprising
   (a) a rectangular cover member connected along one longitudinal edge thereof with an external surface of one longitudinal side wall of the container, said cover member extending over the container;
   (b) claiming means connected with an external surace of the other longitudinal side wall of the container;
   (c) a roll bar containing on its outer surface first and second diametrically-arranged longitudinally-extending grooves;
   (d) first means for connecting the other longitudinal edge of said cover with said roll bar within said first groove; and
   (e) means for connecting said roll bar with said clamping means, including
      (1) fastening means including at least one slide member slidably connected with said roll bar second groove for longitudinal displacement within said groove to a position vertically aligned with said clamping means; and
      (2) means connecting said slide member with said clamping means, said clamping means being operable from a released condition to a clamped condition to tension said cover via said roll bar and said connecting means, whereby when said cover member is in an unrolled condition covering the top of the container and said connecting means are connected with said clamping means said clamping means are operable to clamp said roll bar and tension said cover member in the unrolled condition, and when said connecting means are disconnected from said clamping means and said roll bar is rotated toward said container one longitudinal side wall, said cover member is rolled about said roll bar to uncover the top of the container.

2. Apparatus as defined in claim 1, and further including means preventing displacement of said slide member longitudinally of said roll bar.

3. Apparatus as defined in claim 1, wherein said roll bar first groove is defined by a pair of opposed retaining flanges connected with said roll bar and defining a gap between the free ends thereof, wherein said other longitudinal edge of said cover member includes a longitudinal pocket extending within said first groove, and further wherein said first connecting means includes a retainer member inserted longitudinally within said pocket to prevent withdrawal of said other longitudinal cover edge from said first groove in a direction normal to the axis of said first groove, said retainer member having a cross-sectional transverse dimension greater than the gap defined between the free ends of said retainer flanges.

4. Apparatus as defined in claim 1, wherein said clamping means comprises adjustable toggle clamp means including a toggle bracket member connected with the other longitudinal side wall of the container, and a toggle lever arranged for pivotal movement between released and clamped conditions, respectively, relative to said bracket member.

5. Apparatus as defined in claim 4, wherein said toggle bracket member contains a plurality of vertically spaced recesses, and further wherein said toggle lever includes at one end a horizontal cross bar portion arranged within a selected one of said recesses, said toggle lever having at its other end a handle portion, said adjustable toggle clamp means further including means connecting a cable end with an intermediate portion of said toggle lever, and locking means for releasably retaining said cross bar portion within said selected recess.

6. Apparatus as defined in claim 5, wherein said locking means comprises a locking plate fastened to said toggle bracket member across said recesses.

7. Apparatus as defined in claim 1, wherein said roll bar comprises an extruded member including at at least one end thereof means adapted for connection with a roll bar operator.

8. Apparatus as defined in claim 1, wherein said roll bar has a generally circular outer cross-sectional configuration, said first and second grooves being defined within the circular profile of said roll bar.

9. Apparatus as defined in claim 8, wherein said roll bar is hollow throughout its length.

10. Apparatus as defined in claim 9, wherein said roll bar includes on its outer periphery at said one end thereof a plurality of equally-spaced circumferentially arranged longitudinally extending ribs, and further wherein a roll bar operator includes crank handle means for rolling said roll bar about its longitudinal axis to wind said cover thereon, said crank handle means including an internally splined tubular sleeve portion adapted to receive in concentric mating non-rotatable relation said externally ribbed end portion of said roll bar.

11. Apparatus as defined in claim 1, wherein said roll bar has a cross-sectional configuration defining a pair of portions each of which is hollow, one of said hollow portions being slotted throughout its length to define said first groove, the other of said hollow portions having a non-circular internal profile for receiving a non-circular portion of a roll bar operator.

* * * * *